Aug. 12, 1924.
T. B. WRIGHT
RECEPTACLE
Filed Jan. 24, 1922
1,504,300
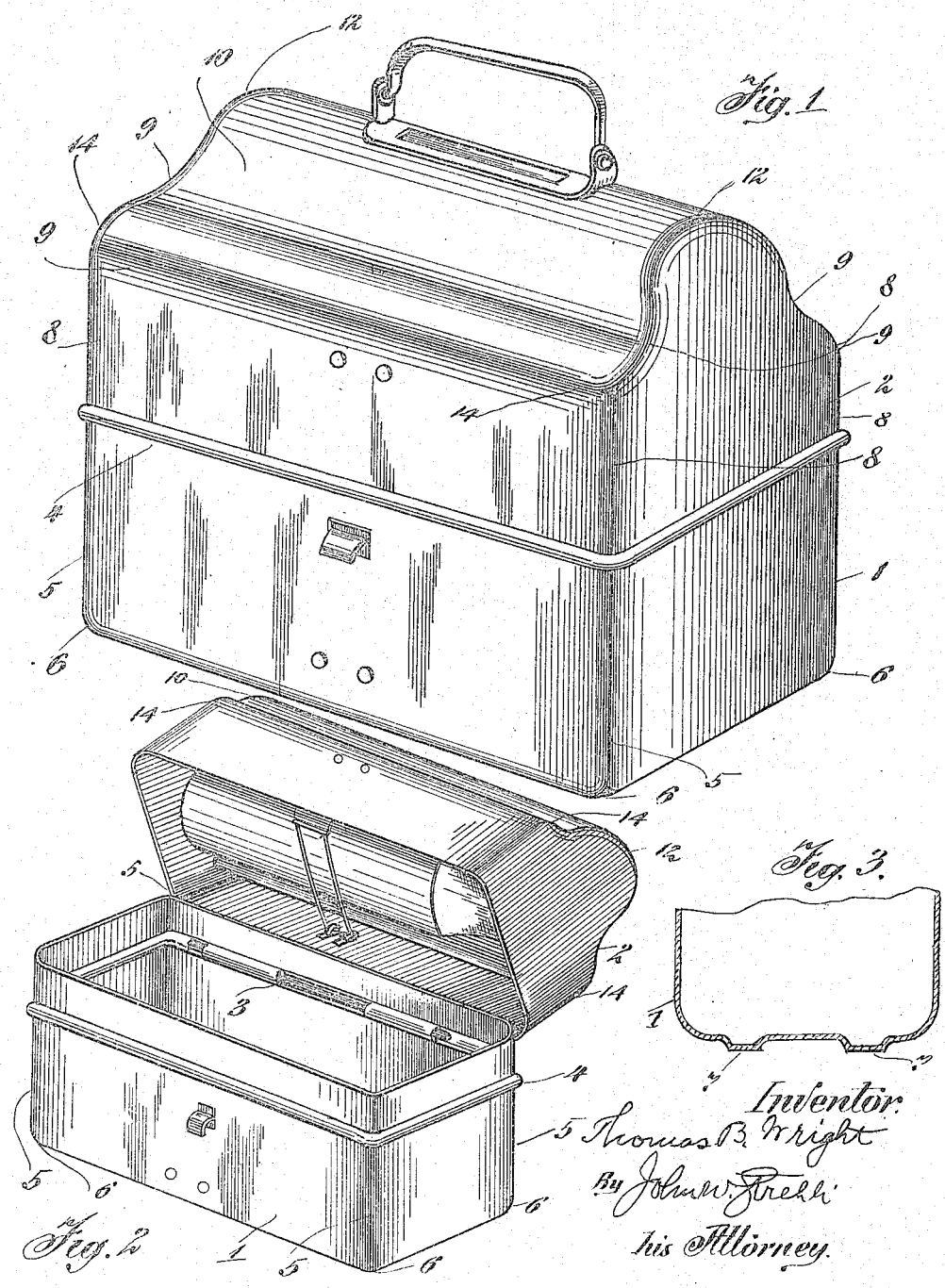

Patented Aug. 12, 1924.

1,504,300

UNITED STATES PATENT OFFICE.

THOMAS B. WRIGHT, OF CINCINNATI, OHIO.

RECEPTACLE.

Application filed January 24, 1922. Serial No. 531,477.

*To all whom it may concern:*

Be it known that I, THOMAS B. WRIGHT, a citizen of the United States, residing at the city of Cincinnati, in the county of Hamilton and State of Ohio, have invented certain new and useful Improvements in Receptacles, of which the following is a specification.

The object of my invention is to produce a simple receptacle or container for holding articles of various kinds, and usually composed of an upper and a lower part, and preferably hinged together, one part acting as a lid or top; and the salient feature of the inventon consists in drawing each half of the container or receptacle out of one sheet of material in such a manner that there will be no sharp corners or angles but all corners and edges of each half will be round or rounded, thus making the receptacle highly sanitary, especially when used as a lunch box; no dirt, food, débris or other extraneous matter can find a home or collect in any corner or any part of the box; there being no place for it to lodge and when the receptacle is cleaned all foreign matter will readily leave and wash out; thus the receptacle will always be clean, fresh and highly sanitary.

The entire receptacle is seamless, and, at any point in its makeup, where a straight or angular line would appear or come, it is rounded off as shown.

While it may be made of any material, one of a more ductile nature is preferred.

The receptacle may be made of any shape, configuration or contour; in the present instance I show the receptacle of a rectangular form with a peculiarly shaped dome-like or arched top, but I do not limit myself to such construction.

All angles in this receptacle are curvilinear.

In the accompanying drawing, forming a part of this specification:

Fig. 1, is a perspective view of the receptacle in closed position,

Fig. 2, is a perspective view thereof, the top raised, and open in position, and Fig. 3, being a cross-section of lower compartment broken partly away to show feet on the bottom.

The receptacle is made up, in the present instance, of the lower part or compartment 1, and the upper part or compartment 2; these compartments being hinged together by hinge 3, so that the top compartment 2, will swing on the lower compartment, or vice versa.

In the present instance, the lower part and the upper part are of a rectangular shape, except that the upper part has a peculiarly shaped arch-like top; a bead as 4 passes around the lower part 1 near its top edge, for strength and to limit the downward movement of the top part 2.

It will be seen from the drawing that the corner edges 5 are rounded and that the corners 6 are also rounded and that said bottom part 1 is entirely seamless and made out of one piece of material, stamped, drawn, or manipulated to form a seamless receptacle part, which has no straight lines therein, all the lines merging to form curves.

The top part is formed up of one seamless piece of material the same as the bottom part and all its angles are curvilinear the same as they are in the lower part.

It will be seen from the drawing that the corner of the meeting edges 8 of the top 2 are also rounded and that the meeting points designated by the numeral 9 between the body part of the top compartment 2 and its top part is also curved and the dome-like or peculiarly shaped arched top 10 is also rounded and its edges at each end are curved and rounded; these curved edges marked 12 where they join the ends which form the top part are also curved in both directions as are also the corners 14 so that no angular or straight lines appear in the slightest degree, all said angles being curvilinear.

The feet 7 shown in Fig. 3, are stamped into the bottom and are approximately concave so that they will have no angular lines.

While I have described one specific formation of my new invention, I wish to be understood as not limiting my self thereto, that the same may be changed without departing from the principle and spirit of the invention.

What I claim as new and my invention and desire to secure by Letters Patent is:

A sanitary lunch receptacle consisting of upper and lower parts, each formed of a single piece of stamped metal, said lower part having a bottom, and side and end walls, the side walls being parallel to one another and the end walls also being parallel to one another, curved corners connecting the side and end walls and curved corners also connecting the side and end walls to the bottom, a bead formed integral with the side and end walls and extending outwardly to form a substantially continuous flange arranged below the upper edge of the lower portion of the receptacle, the upper portion of the receptacle having a top, and side and end walls, the side walls of the upper portion being parallel and being adapted to snugly engage the side walls of the lower portion, and the end walls of the upper porting being parallel and adapted to engage the end walls of the lower portion, the lower edge of one of the walls of the upper portion being hinged to the bead of the lower portion, so that the portions will overlap for a considerable height when the upper portion is closed on the lower portion, the upper portion having the central part of its top of semi-cylindrical shape from end to end and the outer parts of said top being substantially concave from end to end, all of the corners of the top portion being rounded on the interior to facilitate cleaning.

In testimony whereof, I affix my signature at Cincinnati, Ohio, this 17th day of January, 1922.

THOMAS B. WRIGHT.